United States Patent [19]
Fevre et al.

[11] Patent Number: 5,820,467
[45] Date of Patent: Oct. 13, 1998

[54] HOMOKINETIC JOINT HAVING A CENTER BALL UNIT AND TUBULAR SLEEVE WITH CIRCUMFERENTIALLY SPACED AXIAL SLOTS AND INTERNAL AXIAL RIBS ALONG OPPOSITE EDGES OF THE AXIAL SLOTS

[75] Inventors: Laurent Fevre, Saint-Sulpice; Jean-Christophe Bodin, St Omen; Amar Bouguerra, Blois; Bernard Sevault; Gérard Le Du, both of Vendome, all of France

[73] Assignee: Lemförder Nacam S.A., Vendome, France

[21] Appl. No.: 602,880

[22] Filed: Feb. 16, 1996

[30] Foreign Application Priority Data

Feb. 9, 1905 [FR] France ................................ 95 01936

[51] Int. Cl.⁶ ........................................................ F16D 3/32
[52] U.S. Cl. ............................................ 464/118; 464/905
[58] Field of Search ................................... 464/117, 118, 464/125, 905; 403/133, 135, 141, 142, 143

[56] References Cited

U.S. PATENT DOCUMENTS

| | | | |
|---|---|---|---|
| 2,278,698 | 4/1942 | Green | 464/117 X |
| 2,855,232 | 10/1958 | Kozak | 403/143 X |
| 3,029,618 | 4/1962 | Bouchard et al. | |
| 3,226,141 | 12/1965 | Sullivan | 403/135 |
| 3,301,008 | 1/1967 | Beinke | |
| 3,385,081 | 5/1968 | Wier | 464/125 X |
| 3,787,127 | 1/1974 | Cutler | 403/133 |
| 4,207,757 | 6/1980 | Onuma | |
| 4,318,627 | 3/1982 | Morin | 403/133 |
| 4,360,284 | 11/1982 | Brandenburg | 403/142 X |
| 4,690,581 | 9/1987 | Umemoto et al. | 403/133 |
| 4,720,205 | 1/1988 | Ito | 403/135 X |
| 4,725,159 | 2/1988 | Wood | 403/143 X |
| 5,044,811 | 9/1991 | Suzuki et al. | 403/133 X |
| 5,427,467 | 6/1995 | Sugiura | 403/133 X |

FOREIGN PATENT DOCUMENTS

| | | |
|---|---|---|
| 93 400 519.0 | 3/1993 | European Pat. Off. |
| 2157181 | 5/1973 | France . |
| 664786 | 8/1938 | Germany . |
| 28 54 232 A1 | 12/1978 | Germany . |
| 2854232 | 6/1980 | Germany ............................... 464/118 |
| 2 089 471 | 11/1981 | United Kingdom . |
| 2 098 888 | 1/1982 | United Kingdom . |
| 2 107 826 | 10/1982 | United Kingdom . |

*Primary Examiner*—Daniel P. Stodola
*Assistant Examiner*—Gregory J. Strimbu
*Attorney, Agent, or Firm*—Emmanuel J. Lobato, P.C.; Lackenbach Siegel Marzullo Aronson & Greenspan, P.C.

[57] ABSTRACT

A homokinetic joint for linking a driving shaft and a driven shaft of an automotive steering column for transmission of rotation between the driving shaft and the driven shaft. The joint has two opposite end yokes with a coupling yoke intermediate the two end yokes. The end yokes each have an end hub for linking a respective one of the shafts thereto and branched arms defining a yoke or fork opposite the hub for linking the end yoke to the coupling yoke. Two pivotable cross-pieces link the two end yokes respectively to the coupling yoke for positioning the axes of the shafts for homokinetic transmission of torque. A center ball joint unit has a ball stud and spherical ball fixed on one of the end yokes and a guide carried by the other of the end yokes. A sleeve is disposed in the guide and the ball is disposed in the sleeve. The spherical ball is angularly movable in the sleeve for angular offset variation between the shafts during transmission of torque.

9 Claims, 6 Drawing Sheets

HOMOKINETIC JOINT HAVING A CENTER BALL UNIT AND TUBULAR SLEEVE WITH CIRCUMFERENTIALLY SPACED AXIAL SLOTS AND INTERNAL AXIAL RIBS ALONG OPPOSITE EDGES OF THE AXIAL SLOTS

FIELD OF THE INVENTION

This invention relates generally to homokinetic joints and, more particularly, to homokinetic joints with a center ball, especially those designed for linking two shafts of an automotive vehicle steering column.

BACKGROUND OF THE INVENTION

Steering column transmissions often use cardan joints between the shaft carrying the steering wheel and the shaft supporting the rack pinion. These transmissions may comprise one cardan or more, but the most current ones comprise two cardans.

Because of its particular kinematic properties, the known cardan creates a homokinetic defect between the rotation speed of the shaft supporting the steering wheel and the rotation speed of the shaft supporting the rack pinion. This defect increases with the increasing operating angle of the cardan. In the case of a transmission provided with several cardans, and especially with a two cardan transmission, the cardans are assembled so that their respective homokinetic defects compensate for each other, at least partially, so that the overall defect may be acceptable. However, in the case of single cardan transmissions with a high operating angle or even in the case of two cardan transmissions, with respective operating angles quite different, the resulting homokinetic defect cannot be compensated for sufficiently and remains unacceptable. It is then necessary to use a homokinetic joint.

A homokinetic joint is a system that makes it possible to transmit the movement of a driving shaft to a driven shaft without any rotation angular offsets, whatever the angle described by those two shafts with respect to one another. A homokinetic joint with a center ball comprises a double cardan joint and of a spherical ball securing the link between both joints. The ball allows the application of an essentially equivalent operating angle to each cardan joint. Taking into account the fixed distance between both cardan joints, perfect homokinetic transmission is available for a zero angle and for an offset angle determined by design only. It is also known that for such a joint, the maximum angular offset corresponds to a negligible value in comparison with the clearance, the elastic properties and the manufacturing tolerances of the parts.

SUMMARY OF THE INVENTION

The object of the invention is to obviate the above deficiencies while diminishing the operating clearance as well as making the machine cycles easier.

Another object of the invention is to provide a homokinetic joint, with a center ball, whose reduced space requirements make possible a particularly advantageous application to a steering column.

The invention relates to a homokinetic joint, with a center ball, designed for linking two shafts, comprising two end yokes each linked to one of the shafts. Each of the end yokes has two arms on the other side linking the end yokes to an intermediate linking yoke via cross-pieces and a spherical center ball positioned at the end of the arms of the end yokes. The ball is carried by a support and movable inside a guide, the end yokes are curved at the level of their link with the support of the sphere and the guide of the center ball. The guide has a tubular sleeve disposed therein. The sphere carried by the support is angularly movable inside the guide sleeve.

In the joint according to the invention, the arms of the end yokes are curved at the level of their link with the sphere support and the guide of the center ball, whereby this curve provides the yokes with a convex external contour. The invention thus makes it possible to reduce the rotation space requirements with respect to those required in the case of a device whose end is rectilinear.

According to known embodiments of cardan joints, end yokes can be found whose arms are curved with a view to improving the positioning and the holding in place of the bearing bushings fastening the cross-piece. With this invention, the curve of the end yoke arms is used in a homokinetic joint, for the fastening of the center ball on the end yokes.

According to an embodiment of the invention joint, the curve of two arms of at least one of the end yokes is inscribed in the volume corresponding to the radial space requirements of both those arms during their rotation. Thus, the curvature of both arms may correspond essentially to those space requirements or be more accentuated. The latter arrangement still makes it possible to improve the positioning and the holding in place of the needle bushings or dowels, while fastening the cross-piece with respect to the arms of the yoke, especially if the latter is made of thin metal sheet.

According to an alternative embodiment, the curvature of the arms of the end yokes is essentially cylindrical in shape.

Advantageously, the link between the end yokes and the center ball is secured by tenons, of curved shape, located at the end of the arms of the end yokes, on the one hand, and by mortises, of a corresponding curved shape, located on sphere supporting lugs and on guiding lugs of the center ball, on the other hand.

This link makes it possible to crimp the assembly, by complete local crushing of the tenons and to secure rigidly and definitively the parts amongst themselves. It permits a reduction of the operating clearance.

The sphere and the guide are adjusted with the minimum clearance accepted by the embodiment techniques of these parts.

According to a feature of the invention, a sleeve is disposed inside the guide of the center ball. This sleeve comprises circumferentially spaced axial ribs protruding towards the inside, which makes it possible to reduce the clearance that may remain between the sleeve and the sphere of the ball. These ribs, protruding inside the sleeve, extend axially in order to press against the sphere of the center ball, whatever the offset angle described by the two shafts with respect to each other. The pressure exerted by them onto the sphere is sufficiently small so as not to generate excessive loads that are liable to be detrimental to the operation of the homokinetic joint, but is sufficient to reduce the residual clearance between the sphere and the sleeve. These ribs are also sufficiently flexible to bend whenever a load is applied onto the sphere. They allow the contact surface between the sphere and the sleeve to affect a large sector instead of being limited to the sole ridges of these ribs. Thanks to this increase in the size of the contact surface, the sleeve can sustain greater loads whereby the admissible pressure at the sleeve/sphere interface remains unchanged.

According to this embodiment, the ribs are paired, opposite to each other, separated by a slot.

Advantageously, a clearance exists behind each rib. This clearance, on the one hand, makes the bending of the ribs easier when the sphere bears against the ribs and, on the other hands, provides a reservoir to receive the grease necessary for the lubrication of the system.

This invention may have different, alternative embodiments, each with specific advantages.

According to an embodiment, the sleeve disposed inside the guide of the center ball comprises slots open to one of its ends and grooves open to the other end. This arrangement thus makes it possible the sleeve to adapt the shape of the guide. This arrangement of slots and grooves, with openings at opposite ends of the sleeves, provides the sleeve with a variable geometry according to its diameter, in order to compensate for geometrical dispersions of the guide.

According to another embodiment, the sleeve inserted inside the guide of the center ball is held in position by at least one lug, located at the end of a tongue separated from the body of the sleeve by two grooves. This lug makes it possible to snap fasten the sleeve inside the guide, in order to secure an easy assembly. This lug is removed during assembly and takes its position again when the sleeve is placed inside the guide.

The sleeve may for instance be made of thermoplastic material, especially a polyacetal, a polyamide or a polypropylene (PP). These materials make is possible to obtain, by molding, complex shapes and at low cost. They combine simultaneously: low cost, good mechanical handling, flexibility, temperature handling and good resistance to friction. The thermoplastic material used for the manufacture of the sleeve can also be butylene polyterephthalate (PBTP), phenylene polysulphide (PPS) or a ketone-etherpolyether (PEEK). These materials are especially suitable, in the case of higher operating temperatures.

According to another embodiment, the guide of the center ball is made of a metal sheet. This sheet may be of steel or of aluminum alloy. Such materials make it possible, using known processes, to obtain the final shape of the guide in a very economical way.

According to another alternative embodiment of the invention, the guide of the center ball comprises on its periphery a closing device, comprising two edges of matching shape. In this alternative embodiment, it is also possible to strengthen the closing device, for instance by crimping or welding.

In the case of crimping, the system adopted may consist in crushing or in embossing a crimp in the material of the guide. Crushing, for instance of 0.2 to 1 mm in depth, causes the material to yield so that the edges of the closing system of a matching shape nest into each other more accurately. The shape of the crimp is immaterial, but it is preferably rounded, square, triangular or rectangular, a cross, a star or even a straight line.

The closing device can even be made by welding. Such a closing device makes it possible to fasten the cylindrical shape of the guide of the center ball.

According to another embodiment of the invention, the end yokes are made of thick metal sheet. They can also be made of thin metal sheet or of light metal alloy. The end yokes can be embossed, but they can also be made by other processes, for instance rolling, folding, molding or extrusion. Preferably, the commercial manufacturing process of the end yokes is cold hammering or impact extrusion.

According to another embodiment of the invention, the end yokes are machined from a tube.

According to another embodiment of the invention, the end yokes each comprise a sliding hub provided with a clamping device making it possible to close the individual hubs over the shafts to be linked. This device makes it possible to fasten the homokinetic joint onto the two shafts to be linked, especially of a steering column, without having any particular machining cycles.

Accordingly to another embodiment of the invention, at least one of the end yokes is crimped onto one of the shafts to be linked. An equivalent embodiment consists in assembling an end yoke to one of the shafts by welding and/or bonding and/or pinning, these various assembly modes being able to be combined. Preferably, this assembly is made by a corrugated and/or crimped link.

According to a special embodiment of the invention, the linking hub of at least one of the end yokes is made as a tubular hub. This hub can be linked to one of the shafts using an elastomer sleeve. Such an arrangement makes it possible to absorb some of the vibrations.

According to another embodiment of the invention, at least one of the cross-pieces is linked to a yoke having two arms whose curvature is more accentuated than that corresponding to the cylindrical shape of the envelope described by the rotation of the arms of this yoke. These arms can be those of one of the end yokes or of the center yoke.

In the context of said specification, one considers that the so-called thick metal sheets are approximately 6 or 7 mm in thickness and that the thickness of the so-called thin metal sheets is equal to or less than 5 mm approximately.

Typically, manufacture of a guide of center ball of a homokinetic joint, according to the invention, comprises the following steps:

(a) cutting out a blank;
(b) forming the sleeve into tubular form by embossing or rolling;
(c) shaping the lugs into a desired form;
(d) making the mortises by drilling, punching, boring or countersinking.

Some of these steps can take place simultaneously.

When the closing device of the sleeve is reinforced by crimping, this operation is made after the step (b) and before the step (c).

In cases when the closing device of the sleeve is reinforced by welding, this operation is made after the stage (c) and before the stage (d).

The guide of the center ball can be made from a metal sheet wrought so that the desired form can be obtained. The embossing process makes it possible to obtain the final form in a very economical way.

The other parts constituting the homokinetic joint can be made with conventional materials and processes.

According to an embodiment of the invention, the assembly of the homokinetic joint comprises the following steps:
   insertion of the clamping device inside each end yoke,
   assembly of a cross-piece in each of the end yokes with two needle bushings,
   snap fastening of the sleeve inside the guide,
   assembly and crimping of the guide of the center ball onto an end yoke,
   assembly and crimping of the sphere of the center ball onto the other end yoke,
   assembly of the previous arrangement inside the two yokes with two needle bushings,
   assembly of the arrangement thus formed with the other end yoke / guide / sleeve / cross-piece arrangement with two needle bushings, the sphere being inserted in the sleeve at the same time.

The joint thus assembled may then be fastened to the ends of the shafts to be linked.

BRIEF DESCRIPTION OF THE DRAWINGS

Other features, aims and advantages will be understood from the following description and from the appended drawings, which show embodiments of the invention, without any limitation and wherein.

DETAILED DESCRIPTION OF THE PREFERRED EMBODIMENTS

Described hereinafter is a homokinetic joint designed for linking two shafts, particularly of a steering column. Similar or alike parts described have similar reference numerals. Such a joint comprises, as is already known:

two end yokes 1 and 2, linked respectively on one side to respective shafts (not shown), each have two arms respectively 14 and 24 making it possible to link the end yokes 1 and 2 on the other side to a center yoke 3 via two cross-pieces 9 and 10, and a center ball 5, positioned at the end of the arms 14 and 24 of the end yokes 1 and 2. The ball 5 comprises a sphere 60 on a ball stud carried by a support 6 and is movable angularly inside a guide 7.

According to the invention, the arms 14 and 24 of the end yokes 1 and 2 are curved at the level of the link with the support 6 of the sphere and with the guide 7 of the spherical center ball 5.

Figure 1:
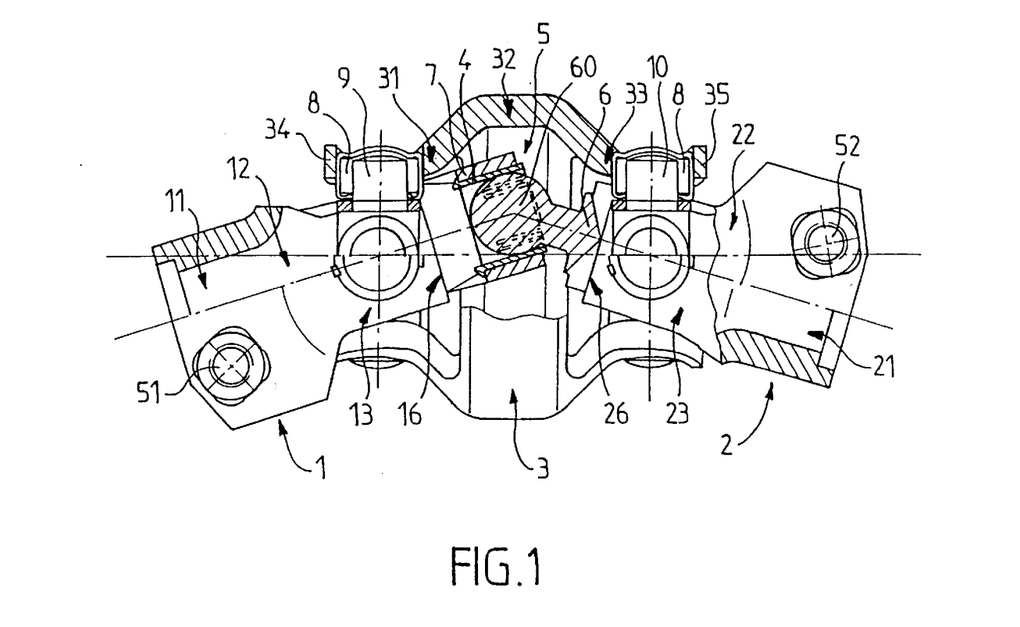
FIG. 1 is an axial cross-section showing a homokinetic joint according to an embodiment of the invention.
Figure 2:
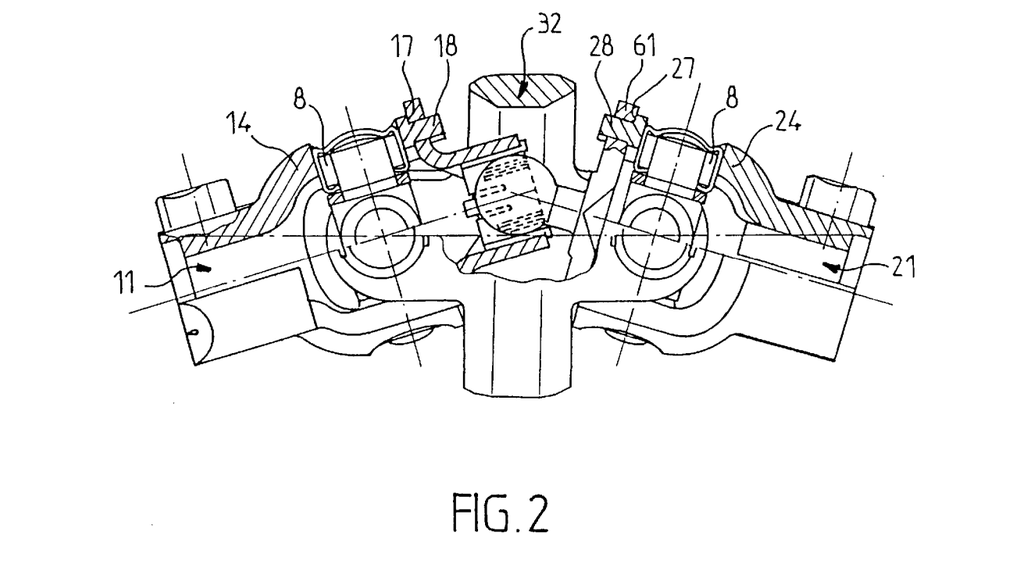
FIG. 2 is a view similar to FIG. 1, after a quarter turn rotation of the two shafts to be linked.
Figure 3:
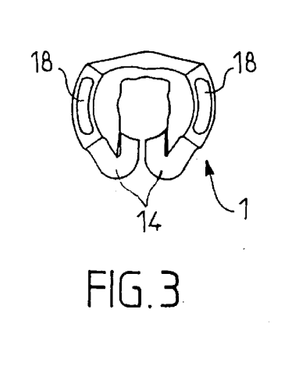
FIG. 3 is a front view of one of the end yokes, of the joint of FIG. 1.
Figure 4:
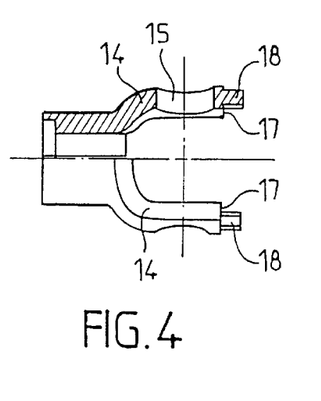
FIG. 4 is a top view, partially in cross-section, of an end yoke, according to FIG. 3.
Figure 5:
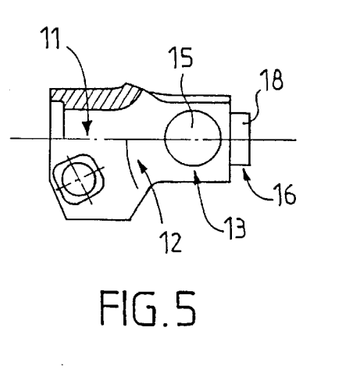
FIG. 5 is a side view, partially in cross-section, of an end yoke, according to FIG. 3.

The end yokes 1 and 2 comprise respectively linking zones 11 and 21 for linking with a respective shaft, intermediate zones 12 and 22 and linking zone 13 and 23 with the respective linking cross-pieces 9 and 10. As can be seen on FIGS. 1 and 2, the linking zones 11 and 21 are each a hub in the form of a jaw each provided with a respective locking device 51 and 52. The hubs make it possible to position the homokinetic joint on the ends of the two shafts to be linked, without having to do any complicated machining. The linking zones 13 and 23 with the corresponding cross-piece 9 and 10 is made as a forked yoke comprising respectively two arms 14 and 24, each provided with an opening 15 or circular bore, in which a needle bushing 8 is disposed. The center yoke 3 or intermediate yoke comprises two linking zones 31 and 33 with the cross-pieces 9 and 10, linked by an intermediate zone 32. Each linking zone 31 and 33 with a cross-piece 9 and 10 comprises two arms 34 and 35, each provided with an opening or circular bore. The end yokes 1 and 2 are linked to the center yoke 3 via cross-pieces 9 and 10 mounted on bushings 8 positioned in the arms 14, 24, 34, 35 of the respective yokes. The center ball 5, comprising the sphere 60, carried by the support 6 and the guide 7, is disposed on the linking zones 16 and 26 located at the ends of the arms 14 and 24 of the end yokes 1 and 2. A sleeve 4 is disposed inside the guide 7 of the center ball 5.

The link between the end yokes 1 and 2 and the center ball 5 is secured by tenons 18 and 28, of curved shape, located at the end of the arms 14 and 24 of the end yokes 1 and 2 using mortises, of a corresponding curved shape, located on lugs 61 of the support 6 of the sphere 60 and on lugs 72 and 73 of the guide 7 of the center ball 5. The lugs 61, 72, 73 of the support 6 of the sphere and of the guide 7 of the center ball abut against shoulders 17 and 27 located at the ends of the arms 14 and 24 of the end yokes 1 and 2. The assembly of the end yokes 1 and 2 of the guide 7 and of the support 6 is held in place by crimping of the tenons 18 and 28. The end yokes 1 and 2 can be made of thick metal sheet. This metal sheet is approximately 6 or 7 mm in thickness. The end yokes can also be made of thin metal sheet, equal to or less than 5 mm, approximately. The end yoke structure makes it possible to position the homokinetic joint of the invention onto a shaft approximately 15 mm in diameter. The space requirements of this yoke are inscribed in a cylinder approximately 46 mm in length and approximately 41 mm in diameter.

Figure 6:
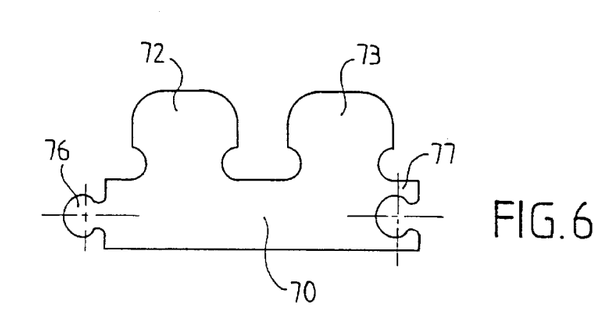
FIG. 6 illustrates the cut of a blank, developed, of a center ball guide, for a joint according to FIG. 1.
Figure 7:
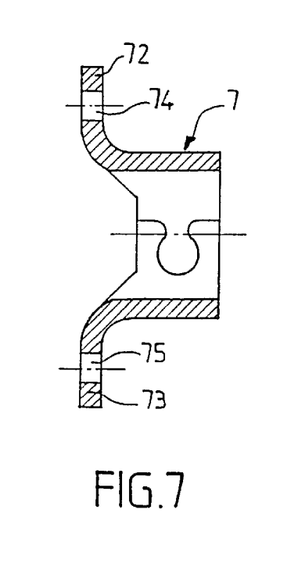
FIG. 7 illustrates a cross-section and side view of the center ball guide, for a joint according to FIG. 1.
Figure 8:
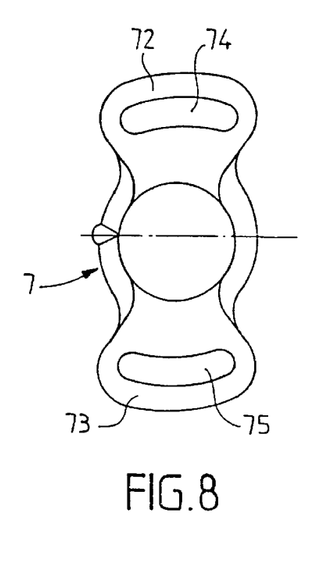
FIG. 8 illustrates a rear view of the center ball guide whose cylindrical part is closed by welding.
Figure 9:
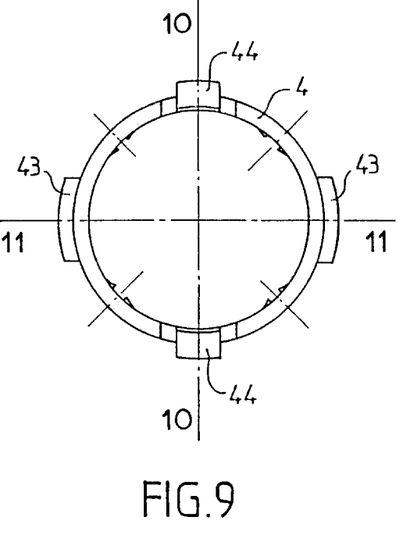
FIG. 9 is a front view of the sleeve, for a joint according to FIG. 1.
Figure 10:
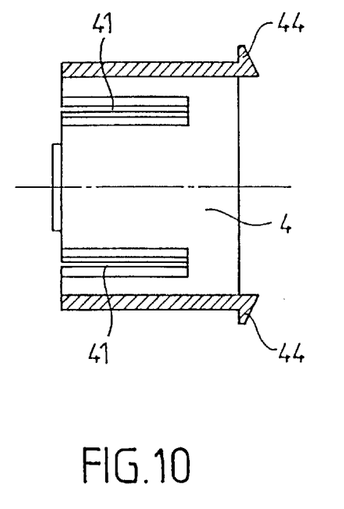
FIG. 10 is a cross-section view along section line 10—10 of FIG. 9.
Figure 11:
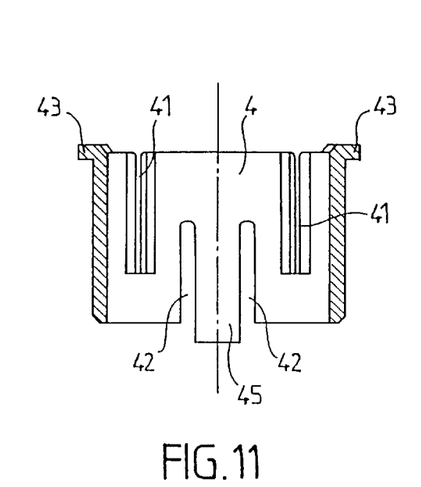
FIG. 11 is a cross-section view along section line 11—11 of FIG. 9.
Figure 12:
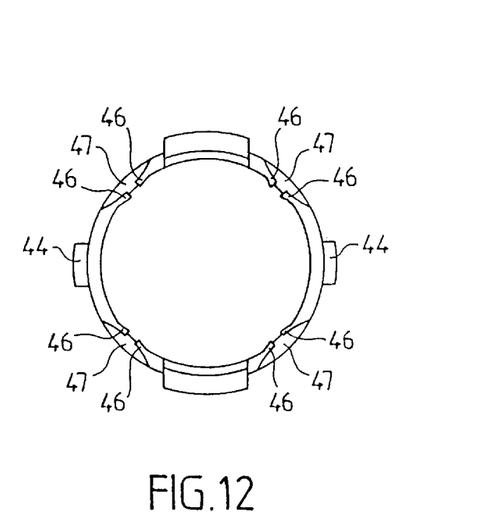
FIG. 12 is a rear view of the sleeve of FIG. 9.

FIGS. 6, 7 and 8 illustrate a particular embodiment of the guide 7 of the center ball 5. According to this embodiment, the guide 7 of the center ball 5 comprises on its circumference a closing device made of two edges 76 and 77 with conjugated forms. The guide 7 may then be manufactured as follows: cutting a blank 70, forming by embossing or rolling, possible reinforcement of the closing device of the sleeve by crimping 78 (if desired), forming the lugs 72 and 73, possible reinforcement of the closing device of the sleeve by welding, production of the mortises 74 and 75 by drilling, punching or boring. According to this embodiment, the closing device comprises a stapling system that makes it possible to close the cylindrical shape of the guide 7 rigidly.

According to a particular embodiment, this closing device is made by welding.

According to a special embodiment, the guide 7 of the center ball 5 is made of a metal, steel or aluminum alloy sheet. According to this embodiment, the blank 70 can be cut in a steel sheet 3 mm in thickness.

The sleeve 4 designed for insertion inside the guide 7 of the center ball comprises circumferentially spaced ribs 46 protruding inside the sleeve 4. The ribs 46 are arranged in pairs, opposite to one another, separated by a slot 41. A clearance 47 is located behind each rib 46. This clearance 47 allows the ribs 46 to bend when the sphere 60 of the homokinetic joint bears upon it. This clearance 47 also makes it possible to provide space for grease to lubricate the system. The sleeve 4, inserted inside the guide 7 of the center ball 5 has slots 41 open at one of the ends of the sleeve 4 and grooves 42 open towards the other end. This arrangement thus allows the sleeve 4 to adapt the shape of the guide 7 while compensating for the dispersion over the diameters of the sleeve and guide. The sleeve 4 is held in position on the guide 7 by at least one lug 44 and a shoulder 43. The lug is located at the end of a tongue 45. This tongue 45 is separated from the body of the sleeve 4 by two grooves 42. These grooves 42 provide, to this tongue 45, comprising a lug 44, the flexibility that is necessary for its removal during the installation of the sleeve 4 inside the guide 7.

According to this embodiment, the sleeve 4 may be made of a thermoplastic material by molding. The material may be a polyacetal, a polyamide or a polypropylene (PP). For higher operating temperatures, materials such as butylene polyterephthalate (PBTP), phenylene polysulphide (PPS) or ketone-ether-polyether (PEEK) can be used.

Figure 13:
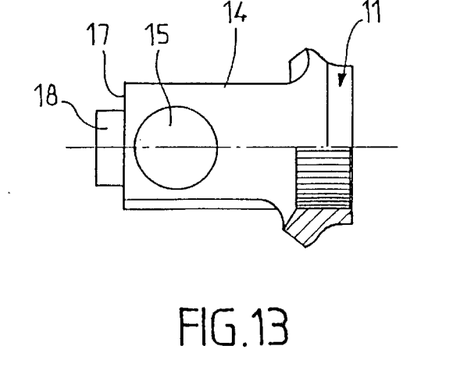
FIG. 13 is a side view, partially in cross-section, of another embodiment of the end yoke.
Figure 14:
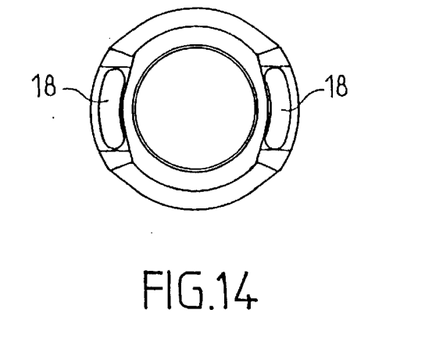
FIG. 14 is a front view of an end yoke according to FIG. 13.
Figure 15:
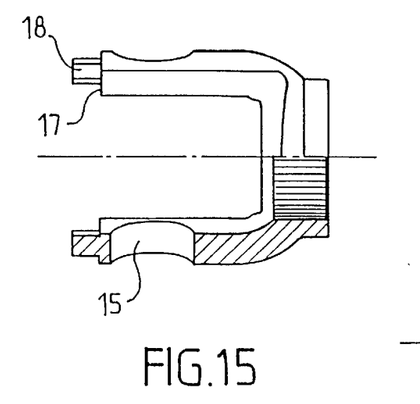
FIG. 15 is a top view, partially in cross-section, of an end yoke, according to FIG. 13.

FIGS. 13, 14 and 15 illustrate a particular embodiment of an end yoke and more precisely of the linking zone or hub 11 with one of the shafts. This hub is chamfered for ease of assembly on a shaft having conjugated chamfers.

Figure 16:
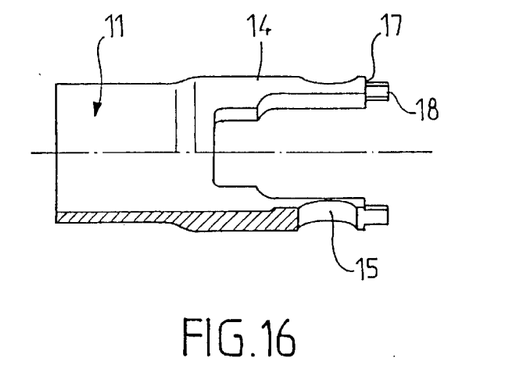
FIG. 16 is a top view, partially in cross-section, of another embodiment of an end yoke.
Figure 17:
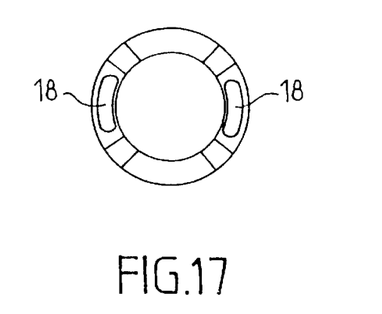
FIG. 17 is a front view of an end yoke according to FIG. 16.
Figure 18:
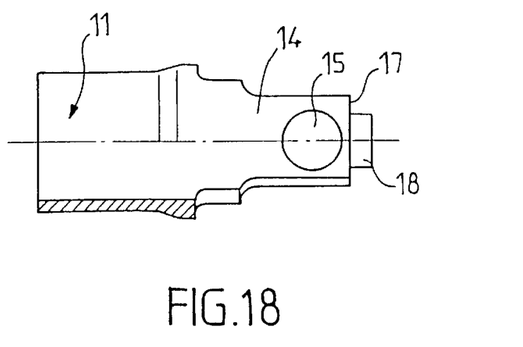
FIG. 18 is a side view, partially in cross-section, of an end yoke according to FIG. 16.
Figure 19:
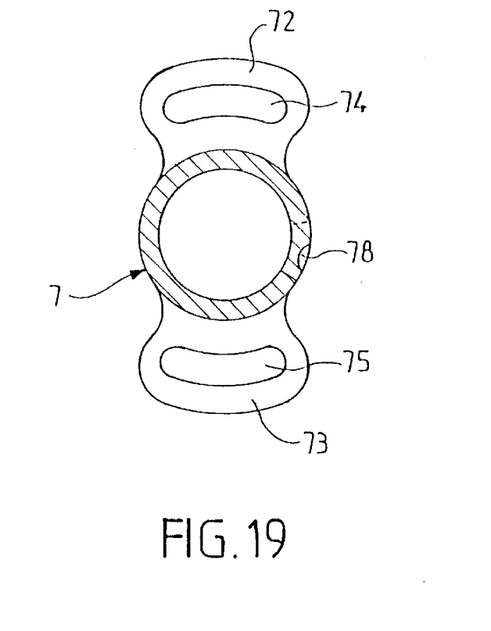
FIG. 19 is a front cross-section view of an embodiment of a guide of the center ball.
Figure 20:
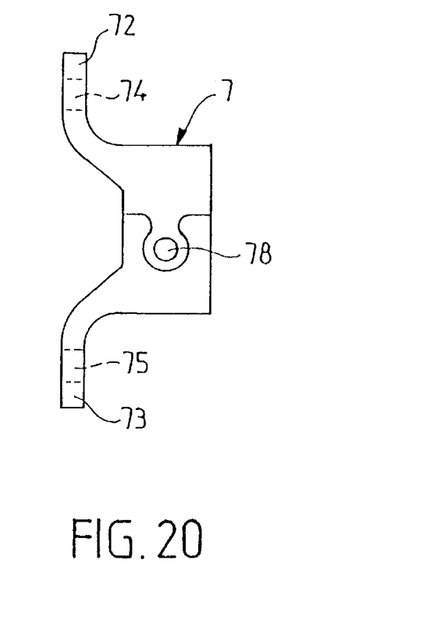
FIG. 20 is a side view of the guide of the center ball according to FIG. 19.
Figure 21:
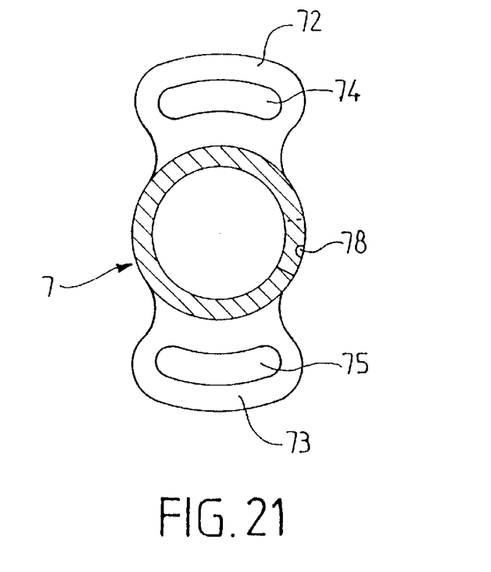
FIG. 21 illustrates a cross-section and a front view of an alternative of a guide of the center ball.
Figure 22:
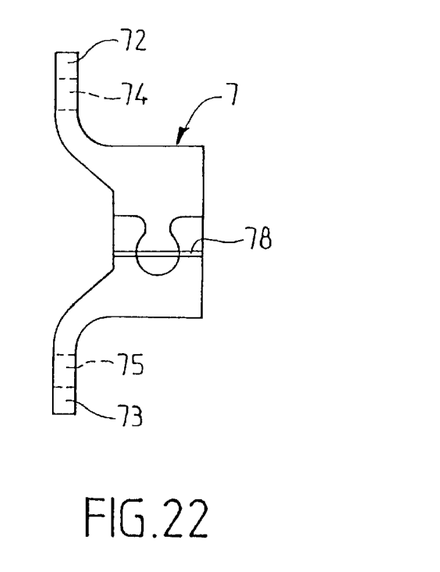
FIG. 22 illustrates a side view of the guide of the center ball according to FIG. 21.

FIGS. 16, 17 and 18 illustrate another embodiment of an end yoke. This yoke can be made from a tube. The linking zone or hub 11 with one of the shafts comprises a cylindrical inside section. This yoke may be assembled in different ways with the corresponding shaft, by crimping, welding or via an elastomer sleeve.

FIGS. 19, 20, 21 and 22 illustrate particular reinforcement embodiments of the closing device of the guide 7 of the center ball 5. In these embodiments, the reinforcement is made of a crimping 78, round in shape on FIGS. 19 and 20, and in the form of a straight line on FIGS. 21 and 22.

Figure 23:
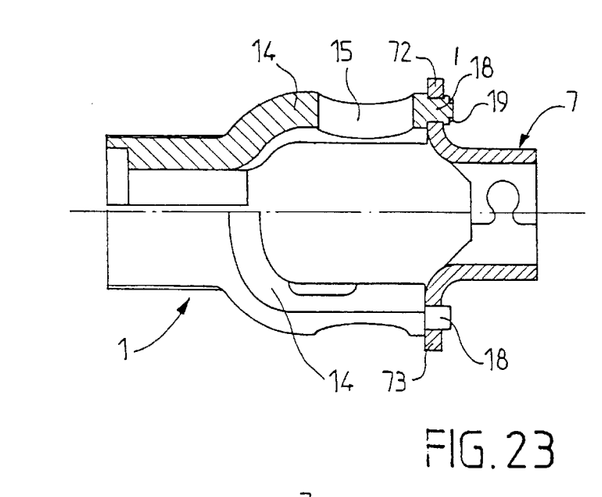
FIG. 23 illustrates a top view, partly in cross-section, of a yoke and a cross-section of an assembly of an end yoke and of a center ball guide.
Figure 24:
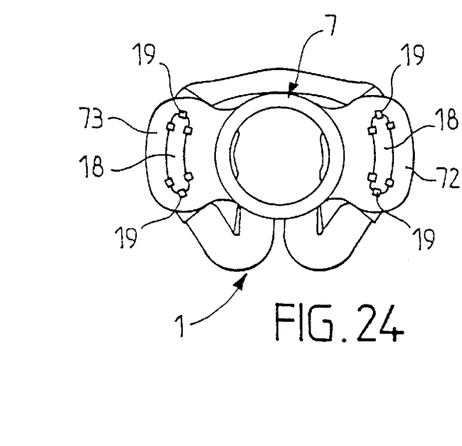
FIG. 24 illustrates a front view of assembly of an end yoke and of the center ball guide, according to FIG. 23.

FIGS. 23, 24 on the one hand and 25, 26 and 27 on the other hand illustrate respectively two examples of an embodiment of linking an end yoke 1 with the guide 7 of the center ball and, more precisely, crimps 19 of the tenons 18 of curved shape enabling this link. Advantageously, these crimps 19 are made on the side ends of the tenons 18, after assembly of the guide 7 on the yoke 1. These crimps may correspond to a surface covering the tenon 18 totally or partially over its width. It is only necessary to obtain a crushing effect causing the material to yield so that the lugs 72 and 73 of the guide are covered partially and so that the edges mate more accurately, thus making the assembly more rigid. The link between an end yoke 2 and the support 6 of the sphere 60 of the center ball 5 may be performed in the same way.

More especially, FIGS. 23 and 24 show an embodiment on which the crimps 19 are made on the edges of the tenons 18.

Figure 25:
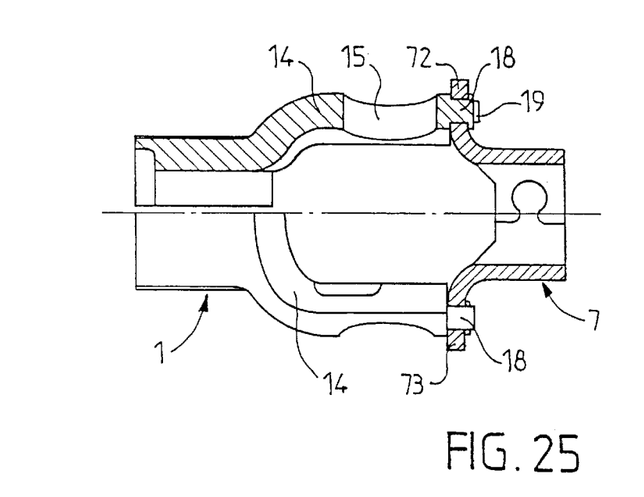
FIG. 25 illustrates a top view, partially in cross-section, of a yoke cross-section of another embodiment of an assembly of an end yoke and a center ball guide.
Figure 26:
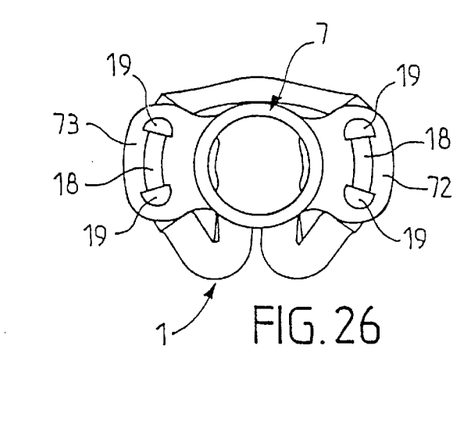
FIG. 26 illustrates a front view of an assembly of an end yoke and of the guide of the center ball according to FIG. 25.

On FIGS. 25 and 26, the crimps 19 cover both ends of the tenons completely.

Figure 27:
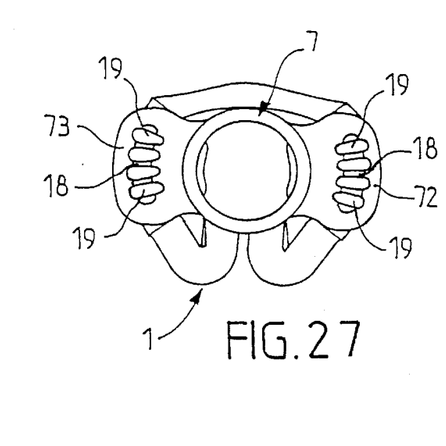
FIG. 27 is another embodiment of the assembly shown on FIG. 26.

As an alternative embodiment, as represented on FIG. 27, a number of crimps 19 are performed transversely on each of the tenons 18.

In operation, both shafts designed for linking describe an angle with respect to each other. The shafts are linked to the homokinetic joint via the hubs 11 and 21 of the end yokes 1 and 2. They are held in position by the locking devices 51 and 52. The power of the driving shaft is transmitted to the output shaft. The loads and the stresses transmitted pass successively in the end yokes 1 or 2 linked to the driving shaft, a first cross-piece 9 or 10, the center yoke 3, the second cross-piece 9 or 10 and the other end yoke linked to the output shaft.

The center ball applies an angle more or less equal to half the angle linking both shafts, between each of the end yokes 1 and 2 and the center yoke 3.

Each cross-piece swivels and rotates around a center point.

The axes of two journals of the cross-pieces remain on a plane perpendicular to the axis of the respective shaft linked to the end yoke connected to the cross-piece. The axes of the other two journals of the cross-piece remain on a plane perpendicular to the axis defined by the center yoke 3. The rotation movement of each cross-piece 9 and 10 defines a cylindrical envelope. The curved shape of the arms 14 and 24 of the end yokes 1 and 2 allows the latter to remain inside an envelope essentially equivalent to that described previously, during the rotation of the linked shafts. This curved shape makes it possible to reduce the rotation space requirements of the end yokes and thus of the whole homokinetic joint. According to an embodiment of the invention, the sphere 60 of the center ball 5 is approximately 15 mm in diameter and the global space requirements of the homokinetic joint are inscribed inside a cylinder approximately 13 cm in length and approximately 6 cm in diameter.

What we claim is:

1. A homokinetic joint for linking a driving shaft and a driven shaft of an automotive vehicle steering column and transmitting torque between the driving shaft and the driven shaft comprising, in combination:

two end yokes each having an end hub for engaging a respective one of said shafts and forked yoke arms opposite the end hub;

an intermediate coupling yoke linking the two end yokes for transmission of torque between the two end yokes;

two cross-pieces linking said forked arms of the two end yokes, respectively, to the intermediate coupling yoke for permitting positioning of respective axes of said shafts for homokinetic transmission of said torque;

a ball joint unit having elements carried by the two end yokes;

said elements comprising a tubular guide on said forked yoke arms of one of the two end yokes, a ball stud fixed to and extending axially on the forked yoke arms of the other of the two end yokes, a tubular sleeve extending axially in said tubular guide, said ball stud having a spherical center ball on a free end thereof; and said tubular sleeve having circumferentially spaced axial slots along a length thereof and having internal axial ribs along opposite edges of each said axial slot, said internal axial ribs extending towards a longitudinal central axis of said tubular sleeve to define circumferentially spaced clearance spaces, each being radially disposed between a corresponding pair of said internal axial ribs and an outer diameter of said tubular sleeve for receiving a lubricant therein, and said spherical center ball being disposed in said tubular sleeve overlying and engaging surfaces of said axial ribs.

2. A homokinetic joint according to claim 1, in which each said corresponding pair of said axial ribs defines an opening between the axial ribs of each said corresponding pair of said axial ribs.

3. A homokinetic joint according to claim 2, in which said tubular sleeve has circumferentially spaced axial grooves along a length thereof, and said axial grooves being open to one end of said tubular sleeve and said axial slots being open to an opposite end of said tubular sleeve.

4. A homokinetic joint according to claim 1, in which said tubular sleeve is made of a thermoplastic material selected from the group consisting of polyacetal, polyamide, polypropylene (PP), butylene polyterephthalate (PBTB), phenylene polysulphide (PPS), and keton-ether-polyether (PEEK).

5. A homokinetic joint according to claim 1, in which said spherical center ball is made of sheet metal.

6. A homokinetic joint according to claim 1, in which said end yokes are made of sheet metal.

7. A homokinetic joint according to claim 1, in which each said end hub comprises a cylindrical interior for receiving an end portion of said respective one of said shafts for linking said respective one of said shafts corresponding said end yoke.

8. A homokinetic joint according to claim 1, in which each said end hub is split longitudinally to define a jaw for clamping an end portion of said respective one of said shafts in said jaw to link said respective one of said shafts to a corresponding said end yoke, and includes a locking device for locking said respective one of said shafts in said jaw.

9. A homokinetic joint according to claim 1, in which each said forked yoke arm has a tenon on an end thereof for mounting one of said tubular guide and said ball stud joint unit on said forked yoke arms of one of the two end yokes and the other of said tubular guide and said ball stud on said forked yoke arms of the other of the two end yokes.

* * * * *

UNITED STATES PATENT AND TRADEMARK OFFICE
CERTIFICATE OF CORRECTION

PATENT NO.   : 5,820,467
DATED        : October 13, 1998
INVENTOR(S)  : Fevre, et al It is certified that error appears in the above-indentified patent and that said Letters Patent is hereby corrected as shown below:

On the title page: Item [30] Foreign Priority: should read
-- Feb. 20, 1995 [FR] France.................95 01936--.

Signed and Sealed this

Twenty-third Day of November, 1999

Attest:

Q. TODD DICKINSON

*Attesting Officer*         *Acting Commissioner of Patents and Trademarks*